United States Patent Office.

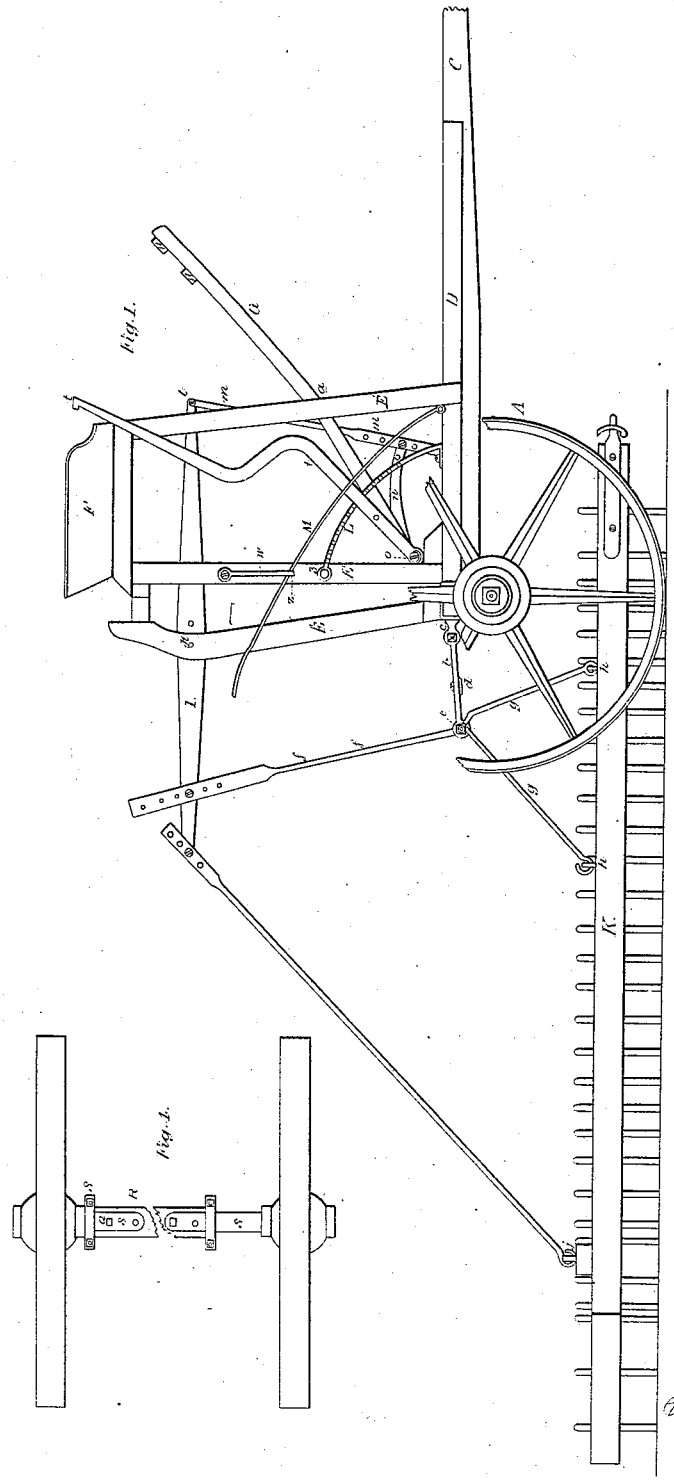

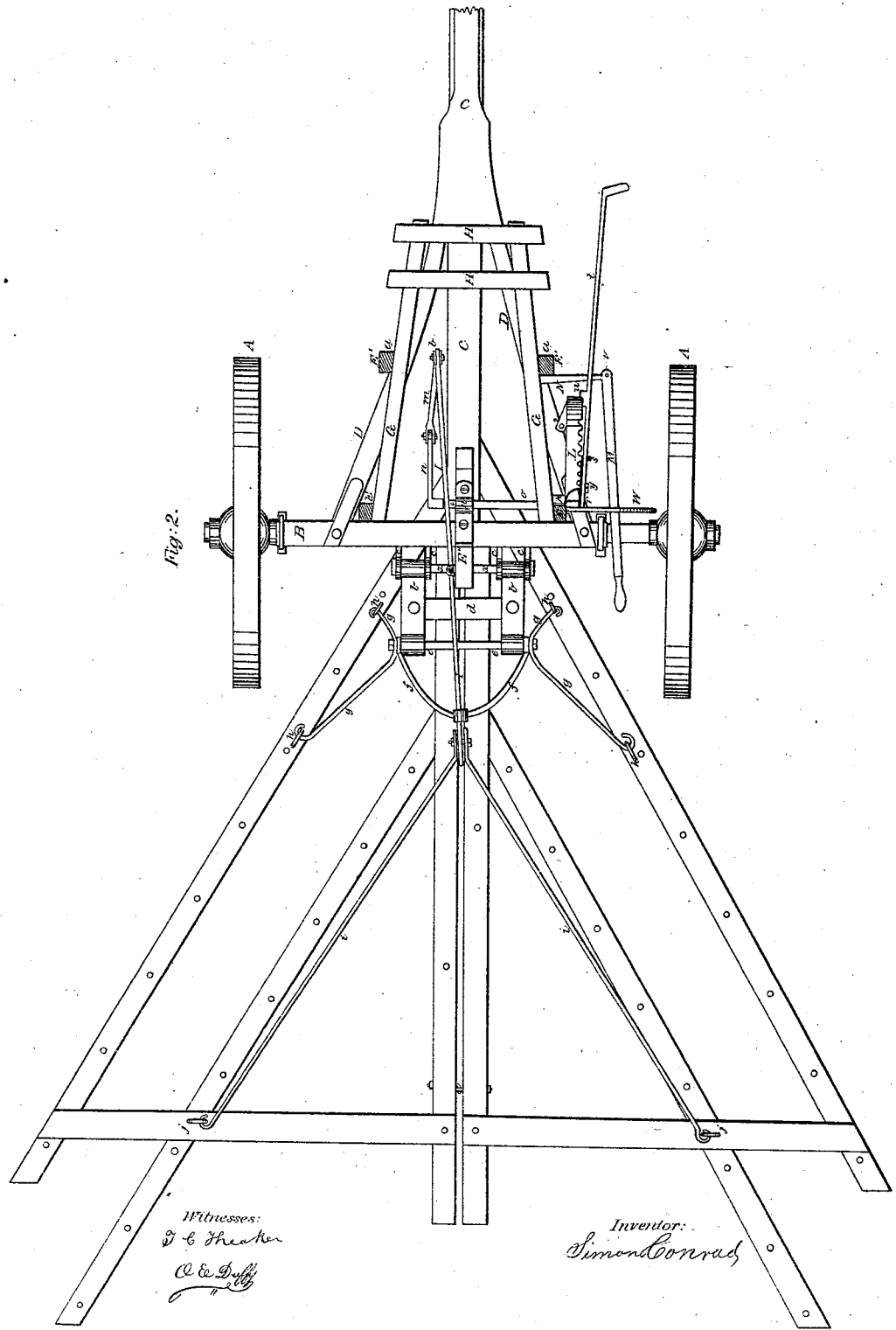

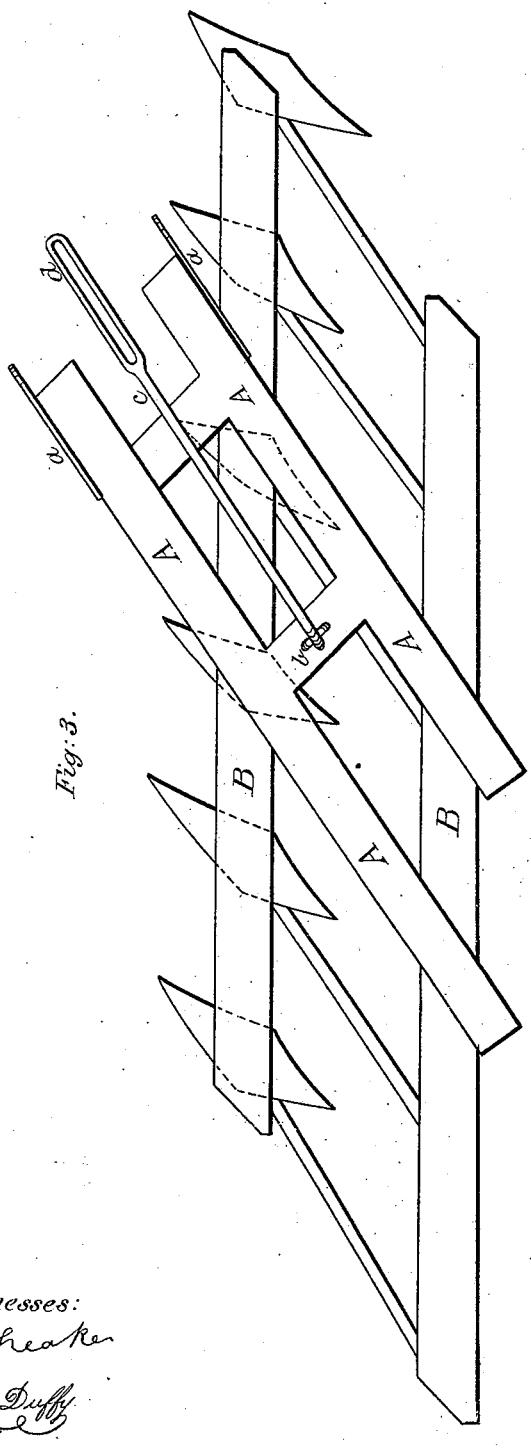

SIMON CONRAD, OF PETALUMA, CALIFORNIA.

Letters Patent No. 76,578, dated April 7, 1868.

IMPROVEMENT IN CULTIVATORS AND HARROWS.

*The Schedule referred to in these Letters Patent and making part of the same.*

TO ALL WHOM IT MAY CONCERN:

Be it known that I, SIMON CONRAD, of Petaluma, in the county of Sonoma, and State of California, have invented a new and useful Improvement in Attachments of Cultivators and Harrows to their Trucks; and I do hereby declare that the following is a full, clear, and exact description thereof, reference being had to the accompanying drawings, in which—

Figure 1 is a side elevation, and
Figure 2 a plan or top view.
Figure 3 is a plan of the cultivator.

The nature of my invention consists in so constructing the truck or carriage and the harrow and cultivator that they can be attached alternately at pleasure, so as to avoid the necessity of making a truck or carriage for each, and thus save the expense of an extra truck, which is an important item.

In the drawings, A are the wheels, B the axle, C the tongue, D D the braces from the tongue to the axle. Upon this tongue, the axle and braces, I erect a seat for the driver, as shown in fig. 1, E E E' E' E'' being posts attached at their lower ends to the braces D and axle B, as seen in fig. 2. Three of them are seen also in fig. 1. On the upper ends of said posts I place the seat F. The two pieces G G, fig. 2, one of which is seen at G, fig. 1, are attached at their lower ends to the posts E E, near the axle B, and at or near their centre they are attached to the posts E' E', as seen at $a$ in figs. 1 and 2, and on their upper forward ends are placed two cross-pieces H H, which form a rest for the feet of the driver.

Into the axle B, as shown at $c\ c\ c\ c$ in fig. 2, and at $c$, fig. 1, I secure four eye-bolts, through all of which the long bolt X extends. Upon this long bolt, and between each pair of the eye-bolts, are placed the pieces $b\ b$, having the brace $d$ attached to them to keep them parallel with each other. Through the eyes at the posterior ends of these pieces $b\ b$ is a long bolt, $e$. On the ends of this bolt, outside the pieces $b\ b$, are placed the lower ends of the forked upright bar $f$, the upper end of which is formed with a long mortise or slot, through which the lever I passes, and having a series of holes through it for the purpose of graduating the altitude of the lever I, by means of a suitable pin through the said holes and through the lever I. Just outside of the ends of this forked bar $f$, and on the same bolt $e$, are placed the braces or supporting-bars $g\ g$, the lower ends of which are attached to the harrow K by means of eye-bolts, as seen at $h\ h$.

To the extreme posterior end of the lever I are attached the brace or supporting-rods $i\ i$, which are attached at their lower ends to the harrow by means of the eye-bolts, as seen at $j\ j$. The lever I passes the part E'', and works on a fulcrum-pin inserted in the part, as seen at $k$, fig. 1; and the lever I is provided with a series of holes for the purpose of changing its position fore and aft upon the fulcrum-pin $k$, as may be desired.

To the forward end of this lever I, at $l$, is attached a bar, $m$, which extends downward to and past the lever $n$. The lower end of this bar $m$ is made with a long mortise or slot, through which the forward end of the lever $n$ passes, both being provided with a series of holes, by means of which and their pin the lever can be regulated at pleasure. This lever $n$ is rigidly attached, at its posterior end, to the oscillating-shaft $o$, which works in bearings $p\ p$ on the tongue C and post E, just in front of the axle B. On the opposite end of the shaft $o$ is a rigid arm, $r$, with a stud extending therefrom, as seen at $s$. To this arm $r$ is attached the long lever $t$, by means of a bolt, $y$, at the extreme lower end of the lever $t$; and the stud $s$, at the end of the arm $r$, passes through the lever $t$, as seen at $s$, and the lever $t$ works freely thereon.

I attach to the brace D, at 2, and to the post E, at 3, fig. 1, the segment L, the outer edge of which is notched to receive the leaf $u$ of the lever $t$, so as to hold it in the desired position. I attach the lever M, at its lower end, to a bar or rest, N, by a small bolt or pin, $v$, this bar N being firmly attached to the brace D in any convenient way. This lever M passes upward and backward past the post E, and through a guard, $w$, which is firmly attached to the said post. This guard is provided with a notch on the upper side of its horizontal part, which extends from the said part at $z$, and which cannot be seen in the drawing. Into this notch the lever M is placed, and when there it bears against the outside of the lever $t$, holding its projecting leaf $u$ in the notches of the segment L.

I construct my harrow in any known and desired way, and attach the eye-bolts $h$ and $j$ to the same, to correspond with the construction of the attachment-devices, as described.

I make my cultivator as follows, viz: I construct a frame, A A, fig. 3, of any desired length, say from four to six feet, the timbers being about three by five inches square; and at the forward end of this frame, and on the outside of each piece A, I secure a bar of iron, $a$, which extends a few inches forward of the pieces A A; and through these bars $a\ a$, in front of said pieces, are holes of the proper size to receive the long bolt, $e$, of figs. 1 and 2, when it is desired to attach the cultivator to the truck or carriage. In the posterior cross-piece of this frame A is placed an eye-bolt, $b$, to which is attached the bar $c$, which has a long mortise or slot in its upper end, as seen at $d$. Through this piece is a series of holes extending nearly the whole length of the said mortise $d$ to receive a pin, which attaches it to the after end of the lever I in figs. 1 and 2, so that it can be regulated, as to elevation, as may be desired. To the under side of this frame A, I secure two pieces, B B, by means of screw-bolts, or in any suitable way, and at any desired angle. These pieces may be of any convenient length, say from five to eight feet, and about three by five inches square; and to the under sides of these pieces I attach a series of cultivator-teeth, each tooth being attached by means of two bars of iron, which are welded together at their lower ends, and then diverge in such a manner as to allow their upper ends to be attached to their respective pieces B B, one to each, thus forming a figure resembling the letter V, to the lower part of which, at the point or place of union of the two bars, I secure, by means of bolts, the cultivator-teeth. All this may be done as may best suit the desire of the builder.

When I desire to remove the harrow and use the cultivator, I take out the long bolt $e$, figs. 1 and 2, and remove the braces or supporting-rods $g\ g$, and remove the long braces or supporting-rods $i\ i$ from the end of the lever I; then remove the harrow; and I then place the eyes of the pieces $a\ a$, which are attached to the frame A of the cultivator, on the outsides of the pieces $b\ b$, figs. 1 and 2, and in such a manner as that the bolt $e$, figs. 1 and 2, will pass through them all, taking care to see that said bolt also passes through the eyes of the forked supporting-rod $f$, as it is used with both harrow and cultivator. I then place the supporting-rod $c$, fig. 3, of the cultivator upon the end of the lever I, figs. 1 and 2, by passing the end of the lever into the mortise $d$ of the rod $c$, and securing them, as desired, by means of a pin or bolt, in any one of the series of holes in the same, and thus the connection is made and the cultivator ready for use.

When it is desired to elevate the harrow or cultivator, when using them, it is done by lifting the lever M out of the notch in the guard $w$, figs. 1 and 2, and moving it outwards from the lever $t$, and then pressing the latter down, which operates the oscillating-shaft $o$ and its lever $n$, and by means of the rod $m$ this motion is made to draw the forward end of the lever I down, and of course the after end is correspondingly elevated, and with it the supporting-rods, which are attached to the said lever, and also to the harrow or cultivator, are raised, and with them the cultivator or harrow is raised, and by holding the lever $t$ in any desired notch in the segment L, their altitude is regulated as may be needed.

When a gang of ploughs are used with the truck or carriage, the spindles, on which the truck-wheels are placed, are so attached to the axle B as to bring the inner ends of the hubs of said wheels close up to the ends of the axle, and the spindle of the wheel which travels in the furrow is attached to the under side of the said axle, and the one upon which the wheel is placed, that travels on the land, is attached to the upper side of said axle, in order to compensate for the different height of the furrow and land, so as to secure, as near as may be, a horizontal position for the axle B, but when the cultivator or harrow is used, the said spindles are both attached to the under side of the axle, and as there must be more space between the wheels of the truck, when the cultivator or harrow is used, than when the gang-ploughs are attached, I make the spindles P, fig. 4, from eight inches to a foot longer inwards than is necessary for the plough-attachment, so that, when the plough is attached, they extend inwards from the screw-bolts Q to the holes R, fig. 4, so that, when I desire to remove the plough and attach the harrow or cultivator, I unscrew the clasps S and bolts Q, fig. 4, and move outward the spindle P, so that the bolts Q will pass through the holes in the spindles, nearest their ends, and then tighten up both the bolts and clasps, and thus the spindles are extended outwards on each end of the axle, to the extent of the distance between the two holes in the spindles, and thus more room is obtained between the wheels for the harrow and cultivator, which is very necessary.

Having fully described my invention, what I claim, and desire to secure by Letters Patent, is—

1. The connecting-devices, by which I attach, at pleasure, the cultivator or the harrow alternately to the truck or carriage, all as shown and described.

2. In combination with the above, the construction of the spindles on which the wheels of the truck are placed, so that they may be so placed on the axle as to increase or decrease the distance between the wheels, as may be desired, all as and for the purposes shown and described.

SIMON CONRAD.

Witnesses:
T. C. THEAKER,
O. E. DUFFY.